(No Model.)
O. H. WOODWORTH.
COMPOUND TRI-LIQUID BAROMETER.
No. 517,089. Patented Mar. 27, 1894.
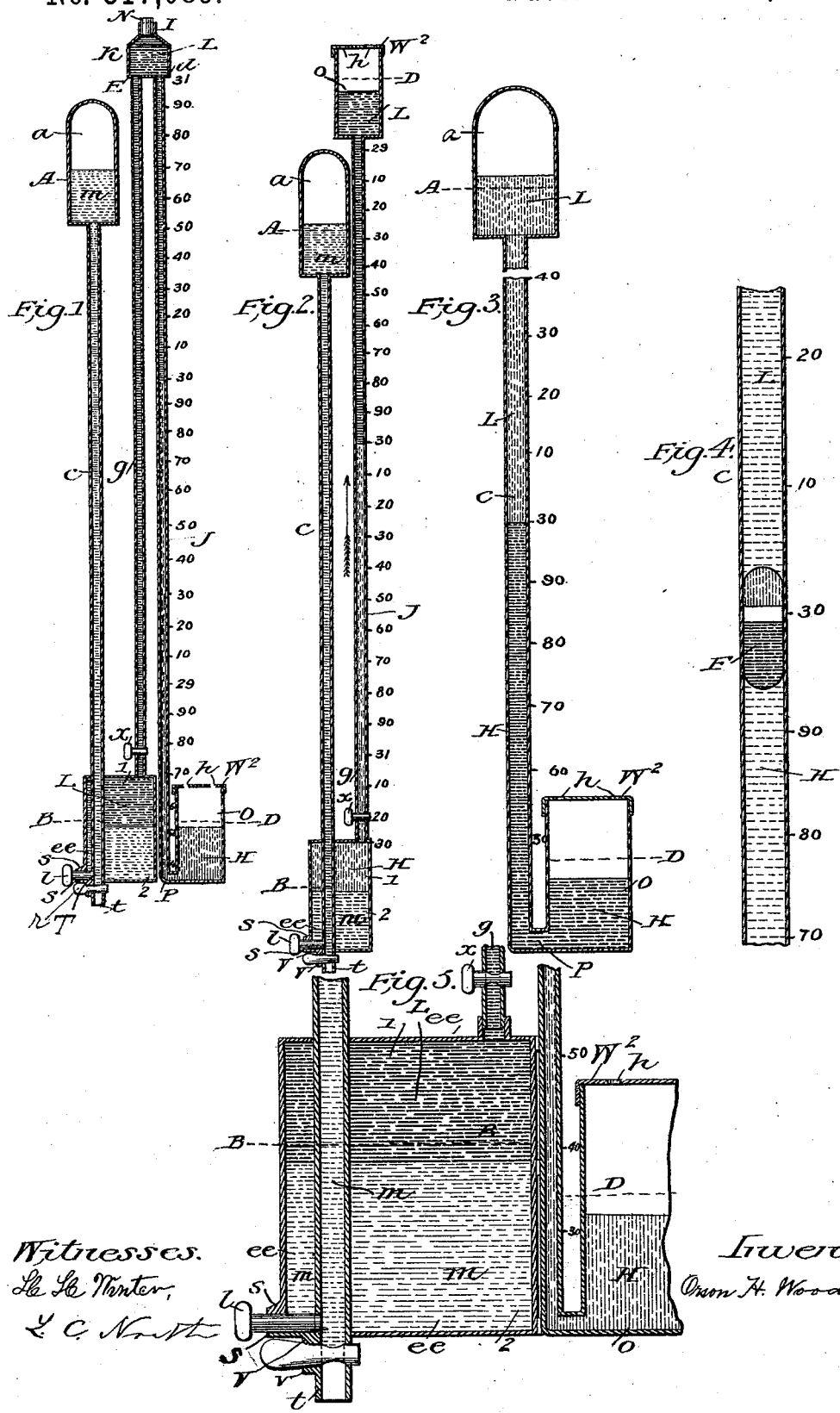

United States Patent Office.

ORSON H. WOODWORTH, OF COLUMBIA CITY, INDIANA.

COMPOUND TRI-LIQUID BAROMETER.

SPECIFICATION forming part of Letters Patent No. 517,089, dated March 27, 1894.

Application filed June 17, 1893. Serial No. 478,030. (No model.)

*To all whom it may concern:*

Be it known that I, ORSON H. WOODWORTH, a citizen of the United States, residing at Columbia City, in the county of Whitley and State of Indiana, have invented certain new and useful Improvements in Liquid-Barometers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The principal object of my invention is to effect substantially the following described improvements in liquid barometers: first,— a greatly lengthened and therefore much plainer reading scale than is practicable in ordinary mercurial barometers; second,—utilizing in a liquid barometer three unblending and diverse liquids, one of which shall be mercury and the other two shall be unblending and non-mercurial liquids differing materially from each other in color and specific gravity; third,—utilizing in the reading scale tube of a liquid barometer two liquids materially differing from each other in color and specific gravity and which will not chemically blend or commingle in the tube but will remain distinctly separate therein with the lighter liquid on top of and upheld by the heavier with a plainly visible point or line of division between them; fourth,—indicating changes of atmospheric pressure by the rising and falling in the reading scale tube of the line or point of division separating two unblending liquids of differing weights and colors; fifth,—a distributing chamber in and through which the movements of mercury and of two lighter and mutually unblending non-mercurial liquids of differing colors and specific gravities shall be actuated by the natural variations in atmospheric pressure; sixth,—marking the changes in atmospheric pressure by means of a buoy floating in the reading scale tube on a liquid that will not chemically commingle or blend with a lighter liquid in said tube which rests on top of the heavier liquid in said tube on which said buoy floats; seventh,—rendering fluid barometers strong and practically unbreakable during handling or transportation thereof by constructing of steel, iron, or other strong and suitable metal, instead of glass, the vacuum reservoirs and mercury-holding tubes used in said barometers; eighth,—improved means and methods of filling the tubes, chambers, and reservoirs of liquid barometers and adjusting the liquids used therein; ninth,—providing the intermediate or supply tube $g$, with a stop-cock $x$, to prevent a mixture of the liquids in distributing chamber $e\ e$ with those in tube $g$, flask K, tube J, and reservoir $o$, and thereby also lessen the danger of breaking the instrument in handling or transportation.

Figure 1 of the drawings shows a detailed sectional elevation of my invention. Fig. 2 is a modified form of Fig. 1. Fig. 3 shows a single tube barometer. Fig. 4 shows tube, $c$, with adjuncts as described, and Fig. 5 is an enlarged representation of the distributing chamber.

In my improved liquid barometer I employ three perpendicular tubes,—one, (tube $c$,) being for mercury and the other two for lighter liquids. For these two lighter liquids I can successfully employ colored alcohol of about .930 specific gravity clear gasoline of about .850 specific gravity, or any other two suitable non-mercurial and non-commingling liquids of materially differing colors and specific gravities. The principal office of the intermediate or supply tube $g$, is to form a pressure connection between the lower end of tube $c$, and the upper end of tube J, by way of flask K. This is necessary in order to enable us to utilize at a convenient height for observation tube J, as a reading scale tube and secure a coincident rise and fall of the liquids therein which shall correspond in direction, but be greatly increased in extent as compared with the simultaneous rise and fall of the mercurial column in tube $c$. By the arrangement of tube $g$, as in Fig. 2, we secure the increased length of scale, but any rise or fall of the liquid therein is always in the opposite direction from the simultaneous rise or fall of the mercury in tube $c$.

In the drawings similar letters or figures of reference indicate corresponding parts throughout the different views.

Fig. 1. represents a central sectional elevation in detail of my invention in which $a$ indicates the enlarged vacuum and mercury reservoir at the upper end of the tube c, containing and supporting the column of mercury m,—e e the distributing chamber at the lower end of tube c, which extends downward through said chamber to outlet t of said tube,—l shows a stop-cock for opening or closing aperture T, in tube c, which when open forms a passage-way for mercury to freely flow out of the lower part of the chamber into the tube or out of the tube into the chamber as the case may be,—r shows a stop-cock for opening or closing outlet t, of tube c,—g shows an intermediate or supply tube extending upward from and having a stop-cock x, near, the top of chamber e e to flask K, which is provided with mouth I, admitting stopper N, and downward from which flask extends the reading scale tube J, to its connection at P, with the open enlarged reservoir o, which has a movable cap $W^2$, provided with ventilating holes, h, in the top thereof.

Fig. 2 represents substantially the same as Fig. 1, except that supply-tube g, flask K, reading scale tube J, and the reservoir o, are omitted or changed and the supply-tube becomes the reading scale tube and connects with and has the open enlarged reservoir o, at its upper end.

Fig. 3 represents a single tube barometer of the ordinary form having my enlarged vacuum liquid reservoir a, at its top and enlarged open reservoir o, at the bottom of the usual upright tube c,—the main perpendicular tube c, and portions of the two reservoirs filled with two non-mercurial and non-mingling liquids of different colors and specific gravities,—the quantities and weights being such that under a normal atmospheric pressure the point of junction and division between the two liquids in the tube shall be, on account of the contrasted colors of said liquids, plainly visible at about "20" of the reading scale, as shown.

Fig. 4 represents tube c, with two semi-transparent, non-mercurial, non-mingling and unblending liquids of different specific gravities meeting in said tube at about "30" of the scale, with the lower and heavier liquid H, floating the buoy F, which projects upward into the lighter liquid L,—and the buoy being brightly colored and plainly visible through the glass tube c, in which it floats loosely and freely, furnishes a plain and distinct marker and indicator of the point of meeting and separation of said two diverse and unblending liquids.

Fig. 5 is an enlarged representation of the distributing chamber e e, tube c extending through said chamber, stop-cocks l, and r, aperture T, stop-cock supports s and v, outlet t of tube c, supply-tube g, reading scale tube J, open reservoir v, and cap $W^2$ with ventilating holes h.

In the drawings m represents mercury, and L shows the lighter and H the heavier of the two non-mercurial liquids used in my improved barometer.

Figs. 1 and 2 indicate the upper and lower halves or nearly equal divisions of the distributing chamber occupied respectively by mercury in the lower half and by a lighter liquid in the upper half.

By my improvements in liquid barometers I obviate three serious and long-felt objections to ordinary mercurial barometers, to wit: great liability to breakage of the perpendicular glass tube containing the mercurial column,—shortness of the range of the rise and fall of the mercury at the top of the column, and inconvenience of observation on account of the elevated position of the reading scale. I obviate the danger of breakage by constructing the reservoir a and mercury-holding tube c, of steel, iron, or other strong and suitable metal instead of glass, the material heretofore universally employed for constructing the upright tubes of mercurial barometers. I can thus successfully use metal because the variations of atmospheric pressure are not indicated in my improved barometers by a reading scale at the top of the column of mercury, but are indicated centrally in enlarged form in my improved reading scale tube J. Therefore I inclose, support and protect the mercurial column in strong metallic tubes,—thus obviating all except the most extraordinary danger of breakage of said tubes and resulting ruin of the instruments.

I greatly increase the range of the rise and fall of the liquid in my reading scale tube as compared with the range of the rise and fall indicated at the top of the column of mercury in ordinary mercurial barometers and thereby greatly elongate the reading scale, by the means herein described, and thus render the reading or scanning thereof much easier than in ordinary barometers.

By my said improvements I also secure the location of the center of the reading scale at or about the center of the whole instrument perpendicularly considered instead of at or near its top,—thus rendering the scale more accessible than in ordinary mercurial barometers.

To fill my improved barometer, (the same being empty in all parts,) I first close aperture T by stop-cock l, open outlet t by stop-cock r, and, inverting the barometer, fill tube c, and reservoir a through said outlet with mercury and then close the outlet by stop-cock r,—the chamber remaining empty.. I next raise the barometer to its normal upright position, and, after inserting a stopper in the upper inner open end of tube J at d, in flask K, where said tube enters said flask, I pour down through said tube into the distributing chamber enough mercury to fill it about half full, as shown. I next pour into the chamber through said supply tube enough of a liquid much lighter than mercury to fill the upper half of the chamber and said tube up to its connection with the flask at E, and then stoppering the upper end of said tube within the flask and the upper open end of reservoir o. I then, after removing the stopper previously inserted at d, pour down through reading scale tube J, and into reservoir o, enough liquid of a plainly different color from, and greater specific gravity than, the liquid in tube g, to fill the empty portion of reservoir o, and also tube J up to "30" as marked on the scale. Then I proceed to fill the upper part of tube J with the same sort of liquid as that used in filling tube g, and, the stopper being removed from said tube, the flask is then filled full of the last named liquid and securely stopped. Then outlet t is opened and sufficient mercury withdrawn to leave the required vacuum in reservoir a and secure the proper length of mercurial column in tube c.

By closing outlet t, and opening aperture T by means of stop-cocks l and r, and unstopping reservoir o, connection is established between the vacuum in reservoir a and the upper surface of the liquid in reservoir o, by the way of and through the liquids in said reservoir, tube J, flask K, tube g, chamber e e, aperture T and the contents of tube c, and reservoir a. With said connection thus established and a perfect vacuum in reservoir a, a normal atmospheric pressure will be exerted on the surface of the liquid in reservoir o,— and assuming that the lower and heavier of the two differently colored and non-blending liquids meeting in tube J at or near "30" of the scale shall have a specific gravity of 1.100 and the upper and lighter of .900, and that tube J shall measure forty inches from flask to reservoir o, and the normal meeting point of the said two liquids is twenty inches below the flask and the length of the tube g about forty inches, it follows that the normal length of the mercurial column in a barometer constructed as here described will differ but little from that in an ordinary mercurial barometer, and that difference will be wholly immaterial for the reason that the fluctuations of atmospheric pressure are marked and indicated in this instrument by the simultaneous and jointly-actuated, though unblended and separate movements of the two diverse non-mercurial liquids in tube J, and no portion of the mercurial column is required or used as a marker or indicator of the changes in atmospheric pressure.

Assuming that under a normal pressure the two diverse liquids meet and divide in tube J at "30" of the scale and that the mercury in reservoir a, the mercury and lighter liquid L in chamber e e, and the heavier liquid H, in reservoir o, all stand at the points or levels indicated in the drawings, then when a decrease in pressure occurs liquid H in reservoir o, will rise toward line D,—the meeting point of the liquids in tube J will fall toward 29,—the line separating mercury m and liquid L, in chamber e e will rise toward line B, and the top of mercury column in reservoir a, will fall toward line A.

In constructing my improved barometer I usually arrange to give the reading scale on or at tube J, a range and length about twenty times as great as that of an ordinary mercurial barometer, and this most desirable effect I produce by making the vacuum reservoir a, with a caliber area twenty times greater than that of reading scale tube J. Following this rule, if the caliber of tube J be made four-sixteenths of an inch that of reservoir a, must be one and one nine-tenths of a sixteenth of an inch, nearly. The calibers of chamber e e, and reservoir o, should be each about equal to, and no less than, that of reservoir a.

The length and range of the upward and downward movements of the two diverse liquids at their point of meeting in tube J, are strictly limited and controlled by the rising and falling of the mercury in reservoir a, actuated by atmospheric pressure and variations thereof exerted on the surface of the liquid in reservoir o; thus, when a sufficient decrease of said pressure occurs to cause a fall of one-twentieth of an inch in the column of mercury in reservoir a, the mercury in lower half of chamber e e rises in inverse proportion as the caliber of the chamber is greater or less than that of reservoir a, and expels from the chamber upward through tube g, a portion of the lighter liquid L, just equal in quantity to the mercury filling the one-twentieth of an inch in reservoir a, which the mercury occupied at the top of the column before the decrease of pressure occurred. The liquid thus expelled or withdrawn from the distributing chamber moves or transfers the liquid from flask K, and down through tube J,—lowering the meeting point of the two diverse liquids in said tube twenty times as far as the mercury fell in reservoir a, and causing a rise in the liquid in reservoir o, proportioned to the comparative calibers of the two reservoirs.

From the foregoing it is evident that if the caliber area of reservoir a, be made twenty times greater than that of tube J, a rise or fall of one inch in the column of mercury in reservoir a, will cause a transfer in either direction of a sufficient quantity of liquids to produce a rise or fall of twenty inches in, at, or by, the point of meeting of the two diverse liquids in said tube, and that the range and length of the reading scale may be increased or diminished at will by changing the comparative caliber areas of reading scale tube J, and reservoir a.

In Fig. 2 the reading scale numbering or indexing is inverted and a fall in the mercurial column in tube c, produces a rise of the point of meeting of the two diverse liquids in the reading scale tube. This renders it necessary to reverse the usual order of numbering the scale.

From Fig. 3, as described and set forth, it is plainly apparent that any two unblending liquids of different colors and specific gravities may be employed and used in the principal upright tube c, of my improved barometer and in the reservoirs a, and o, thereof, and that the length or height of the barometer thus filled with the two diverse liquids will depend on the specific gravities of the liquid used. It is also evident that the principle of determining and controlling the length and range of the rise and fall of the meeting points of the diverse liquids in their reading scale tubes by the comparative caliber areas of said tubes and of their corresponding vacuum reservoirs is universally applicable to my improved liquid barometers as described herein and illustrated in Figs. 1, 2, 3, 4, and 5 of the accompanying drawings.

The reservoir a, is enlarged beyond ordinary size in order that even a slight fall in the mercurial column shall cause the transfer of a considerable quantity of mercury from tube c, through aperture T, into the distributing chamber. Whatever quantity is thus transferred displaces from the upper part of the chamber an equal quantity of lighter fluid L, and expels it upward through tube g, and flask K, and, as a direct result, the lighter fluid in the upper portion of tube J, is forced to displace another equal quantity of the heavier fluid H, therefrom and drive it downward toward and into reservoir o, against the atmospheric pressure on the surface of the liquid in said reservoir. When the supposed fall in the mercurial column, above mentioned, ceases, and an increase of pressure occurs, the above described movements of the liquids in the barometer are reversed through all parts thereof.

Flask K, is utilized as a special means of filling the instrument, and, when filling it, any ordinary stopper may be used in reservoir o, the cap $W^2$, of which is so made as to be easily removable.

Stop-cock x, is used to close tube g, to prevent the mercury in the chamber from mingling with liquid in said tube during the handling or transportation of the barometer.

What I claim as my invention, and desire to secure by Letters Patent of the United States, is—

1. In a liquid barometer, the combination of a vacuum reservoir, an open reservoir, a mercurial column supported in an upright tube, an aperture connecting said tube with a distributing chamber, mercury and a lighter liquid, L, in said chamber, said lighter liquid in tube, g, flask, K, and in the upper portion of the reading scale tube, and the heavier liquid, H, in the lower portion of said tube and in open reservoir, o, substantially as and for the purposes set forth.

2. In a liquid barometer, the combination of a metallic tube to receive and support a column of mercury, and provided with an aperture opening therefrom into a distributing chamber, a stop-cock for opening or closing said aperture at will, said tube provided with an outlet from the lower end thereof and a stop-cock to open or close said outlet at will, substantially as set forth.

3. In a compound liquid barometer, the combination of reservoir a tube c, and the liquid m, therein,—stop-cock r, to open and close the end of said tube,—said tube provided with aperture T, and outlet t,—distributing chamber e, e, and the liquid therein,—stop-cock l, to open and close the side of tube c, within said chamber,—tube g, and the liquid L, therein,—flask K, and the liquid therein,—tube J, and the flask liquid therein, and reservoir o, and the liquid H, therein, substantially as set forth.

4. In a liquid barometer, an upright column of mercury communicating through a closable aperture in the tube containing said mercury with a body of mercury in a distributing chamber, in combination with said mercury-holding tube, a supply tube, a reading scale tube, a lighter liquid resting on the mercury in said chamber and extending upward through the supply tube and connecting through a flask with, and supported by, a heavier liquid in a reading scale tube and an open reservoir, substantially as set forth.

5. As a new article of manufacture, a liquid barometer in which the mercury-holding tube and vacuum reservoir shall be constructed of steel, iron, or other strong and suitable metal, and said tube adapted to be opened or closed at will by stop-cocks, r, and l, substantially as set forth.

6. In a compound liquid barometer, the herein described means for filling the same, consisting of the mercury-holding tube provided with the outlet therefrom,—the stop-cock adapted to open and close said outlet below and outside of the distributing chamber,—said tube provided with an aperture and the stop-cock adapted to open and close said aperture within said chamber,—the supply tube and the stop-cock adapted to open and close the same, and the flask adapted for filling the supply tube, reading scale tube and open reservoir, substantially as set forth.

7. In a compound liquid barometer, the combination of the reservoirs a and o,—the tubes, c, g, and J,—the stop-cocks, l, r, and x,—the tube c, provided with aperture T, and outlet t,—the distributing chamber, e e,—the flask K, and the liquids m, L, and H, substantially as and for the purposes set forth.

ORSON H. WOODWORTH.

Witnesses:
CURTIS W. JONES,
WM. M. MILLER.